United States Patent Office 2,730,711
Patented Jan. 10, 1956

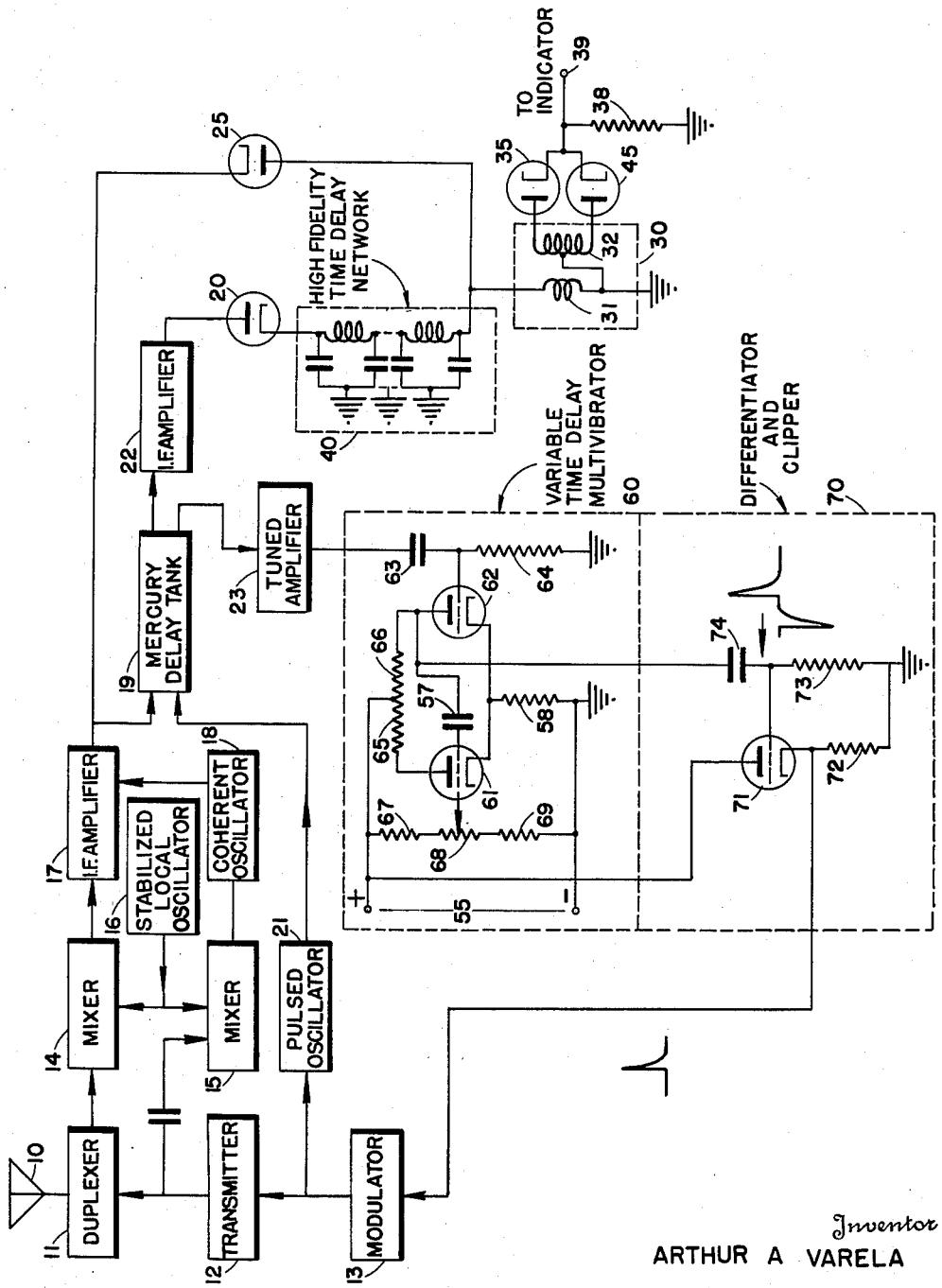

2,730,711

SYNCHRONIZING SYSTEM

Arthur A. Varela, Washington, D. C.

Application December 11, 1945, Serial No. 634,343

6 Claims. (Cl. 343—13)

(Granted under Title 35, U. S. Code (1952), sec. 266)

This invention relates to echo-ranging systems for detection of moving objects; in particular it relates to an improved means of controlling the pulse-repetition period in ranging systems employing the pulse comparison technique of moving object detection.

The pulse comparison technique of detecting moving objects by radio echoes has been the subject of extensive development and study, and it has given promise of being the most flexible and widely useful method of moving object detection. Its basic principle of operation involves the delay of the echoes from one transmitted pulse by an interval precisely equal to the pulse-repetition period of the transmitter, followed by direct comparison of the delayed echoes with the echoes from the succeeding transmitted pulse. The respective echoes from objects having a constant range will thus be compared at precisely the same instant and may, by proper circuit arrangement, be made to cancel. If the range of an object returning an echo has shifted in the time interval between pulses, the delayed echo will not precisely coincide in time with the echo from the succeeding transmitted pulse and cancellation will not occur. Thus echoes from moving objects may be readily distinguished from echoes due to stationary objects.

Practical application of this principle requires, among other things, a means of delaying returning echoes for a full pulse-repetition period, perhaps one or two thousand microseconds, without distroying the signal waveform. This amount of delay is much greater than it is practical to obtain by electrical means, in view of the very high signal frequency components which must be passed. Accordingly, the delay technique developed and now employed in practice is to convert the echo-signals to the form of a sound wave and to transmit the sound wave through a suitable medium for the distance necessary to achieve the delay desired. The wave is then reconverted to electrical form. The medium usually employed to carry the sound wave is mercury, and the delay apparatus normally consists of a mercury tank having quartz piezo-electric crystals mounted at the ends of the tank with their faces in contact with the mercury. The crystals, by reason of their piezo-electric properties, can be made to convert the signals to sound and reconvert them after the delay has been accomplished.

Mercury-tank time delay devices have proved successful but extremely critical in adjustment. It has been found that adjustment for proper operation is difficult at best and the precise time delay occasioned by the tank, even after careful adjustment, is affected by many factors difficult to control. Hence one of the most troublesome problems encountered in the development of radio-detection systems using mercury time-delay tanks has been the synchronization of the mercury-tank time-delay with the pulse-repetition period; that is, the precise time interval between successive transmitted pulses. It is to the solution of this problem that this invention is directed.

An object of this invention is to provide, for an echo-ranging system employing pulse comparison for detection of moving objects, a means of accurately equalizing the pulse repetition period of the transmitter and the net delay effected by the signal-delay channel.

Another object of this invention is to provide, for such a system, a means of maintaining automatically the transmitter pulse-repetition period equal to the net time delay in the signal-delay channel notwithstanding changes in the characteristics of the supersonic delay component of the signal-delay channel.

The invention will be described with reference to the appended drawing, which shows in schematic and block form an embodiment of the invention as employed in an echo-ranging system adapted for moving-object detection.

Referring to the drawing, an antenna 10 is employed for both transmission and reception; it is coupled to a duplexer 11. The R. F. output of transmitter 12 is fed into the duplexer; likewise the R. F. output of the transmitter is loosely coupled to a mixer circuit 15. Power is supplied in intermittent pulses to transmitter 12, by modulator 13. Signals returning to antenna 10 pass through duplexer 11 and are fed into a mixer 14, which is distinct from mixer 15. A stabilized local oscillator 16, similar to the conventional superheterodyne local oscillator but carefully designed for good frequency stability, is coupled to both mixer 14 and mixer 15. The output of mixer 15 is applied to an oscillator 18 which is operative at the intermediate frequency, that is, the difference between the R. F. frequency and the frequency of the stabilized local oscillator. For reasons set forth hereinafter, oscillator 18 is generally known in the art as a "coherent oscillator" and it is so denoted on the drawing. The signals applied to mixer 14 are therein converted to an intermediate frequency and applied to an intermediate frequency amplifier 17. Output voltage from the coherent oscillator 18 is likewise applied to I. F. amplifier 17 and is therein linearly mixed with the signal voltage from mixer circuit 14.

The output of I. F. amplifier 17, being the amplified vector sum of the voltages from mixer 14 and coherent oscillator 18, is rectified by diode 25 and applied to primary winding 31 of pulse transformer 30. The output of I. F. amplifier 17 is also applied to the input of a mercury-tank time-delay device 19. The I. F. frequency output of time-delay device 19 is applied to an I. F. amplifier 22 which is carefully adjusted to have a gain precisely equal in magnitude to the attenuation of delay device 19. The output of amplifier 22 is rectified by diode 20, passed through a high-fidelity time-delay network 40, and then applied to winding 31. Delay network 40 might have a time delay characteristic of two microseconds. Diodes 20 and 25 are connected to give output voltages of opposite polarity; that is, in this embodiment diode 20 is connected to deliver positive voltage to its load while diode 25 is connected to deliver negative voltage to its load.

The secondary winding 32 of pulse transformer 30 has a center tap which is grounded. The terminals of winding 32 are connected respectively to the plate of diode 35 and the plate of diode 45. The cathodes of diodes 35 and 45 are connected together and are connected to ground through a common load resistor 38. An output terminal 39 is shown, connected to the cathodes of diodes 35 and 45. The output voltage appearing at terminal 39 may be applied to a cathode ray indicator.

Referring again to the left-hand side of the drawing, modulator 13, in addition to supplying power in intermittent pulses to transmitter 12, also actuates simultaneously with the transmitter a pulsed oscillator 21, which has a frequency different from but near the I. F. frequency. The output pulses from pulsed oscillator 21 are applied to the input of mercury-tank time-delay device 19. These pulses are taken from the output of delay device 19, after their passage through it, by a tuned amplifier 23, tuned to the frequency of oscillator 21. The output of amplifier 23 is applied through condenser 63 to the grid of tube 62.

Tubes 61 and 62 are connected as a conventional cathode-coupled multivibrator 60, having a stable state wherein tube 61 is conducting and an unstable state wherein tube 62 is conducting. The unstable state may be initiated by applying a positive disturbance to the grid of tube 62. The duration of the unstable state is governed within certain limits by the position of the movable tap on potentiometer 68. In a typical embodiment the constants might be so chosen that the duration of the unstable state could be varied between one-half microsecond and two microseconds.

The output voltage from multivibrator 60, taken from the plate of tube 62, consists of a train of negative rectangular pulses. The time duration of each pulse is equal to the duration of the multivibrator's unstable state, and a pulse is initiated each time the multivibrator is triggered by a signal from amplifier 23. This train of rectangular pulses is applied to a differentiator-clipper 70 which produces as its output voltage a train of very short positive pulses coincident in time with the trailing edges of the rectangular pulses. These short positive pulses are applied to modulator 13, for which they function as trigger pulses.

In the system just described the components which comprise this invention are pulsed oscillator 21, tuned amplifier 23, the high-fidelity delay network 40, the multivibrator 60, and the differentiator-clipper 70. These components in combination operate to insure proper timing of the transmitted pulses. To explain the interrelation of the invention with the system as a whole, the operation of the echo-ranging system without the invention will be first described; the problems likely to arise relative to pulse-timing will be pointed out; and then it will be shown how the invention operates to solve these problems and to insure proper timing.

Referirng then to the operation of the system proper, the coherent oscillator 18 is a continuous wave oscillator at the I. F. frequency which is by each transmitted pulse shocked into phase synchronism with the transmitted pulse signal. (The required shock excitation at the I. F. frequency is provided by mixer 15, wherein the local oscillator and transmitted pulse signals are mixed to produce a very strong I. F. frequency driving voltage. This powerful signal, applied to the tank circuit of oscillator 18, forces oscillator 18 into phase with it. Once this phase is established, oscillator 18 continues to oscillate in it until the next transmitted pulse.) The C. W. signal from oscillator 18 is fed into I. F. amplifier 17 and there mixed with the returning echo signals. Since the voltage from oscillator 18 has phase coherence at all times with the transmitted pulses, the vector sum of the oscillator 18 voltage and the voltage produced by any echo will be identical from echo-pulse to echo-pulse, so long as the range of the reflecting object is not changed. As a result, therefore, the voltage waveform at the output of amplifier 17 will be periodic, from transmitted pulse to transmitted pulse, as to all echo signals from objects at constant range. Echo signals from objects whose range is changing, will not, however, return and mix with the voltage from oscillator 18 in constant phase, because the total length of the echo-path will change from pulse to pulse. Thus the vector sum of the echo signals and the oscillator 18 voltage will be variant from pulse to pulse for echoes from objects whose range is changing.

The voltage output of amplifier 17 is applied directly to pulse transformer 30 through diode rectifier 25 and it is applied after a time-delay of one pulse-repetition period to pulse transformer 30 through oppositely-connected diode rectifier 20. The effect of this procedure is to compare the echoes following one transmitted pulse with the echoes following the next, and to apply them in opposite polarity to the primary of transformer 30. Those echoes which are identical from pulse to pulse will thus cancel one another and produce no net field in transformer 30. Those echoes, on the other hand, which return from objects whose range is changing, will not be identical in phase or amplitude from one pulse to the next, and in consequence will not cancel. Such echo signals will induce voltage pulses in the secondary winding of transformer 30. The induced voltage pulses are rectified by diodes 35 and 45 and may be applied to a cathode ray indicator as in a conventional echo-ranging system.

Plainly, successful operation of the system just outlined hinges on the echo signals from one transmitted pulse being delayed precisely the correct amount of time to superimpose them on the echo signals resulting from the next transmitted pulse. As was stated heretofore, experience with the mercury-tank delay devices has shown that their characteristics are not constant over long periods of time but are effected by many factors which cannot be readily controlled. Consequently systems in which the pulse repetition frequency is controlled independently of the mercury-tank delay device have not been successful.

In seeking a satisfactory means of synchronizing the pulse repetition period with the time delay, a technique tested was that of using one transmitted pulse as it came from the delay device as a trigger to set off the next transmitted pulse. This idea eliminated the necessity for constant mercury-tank delay, but it was unsuccessful because inherent systematic delays in the trigger and modulator circuits caused the pulses to come too late to achieve superposition and cancellation of echoes from stationary objects. The delay in the triggering process was found to be only a fraction of a microsecond, but it was nevertheless too great for successful system operation.

This invention solves the problem in this way: Signals at the I. F. frequency coming through the mercury-tank are delayed an additional time in the high fidelity electrical time delay network 40 before being applied to pulse transformer 30. This delay network must pass without distortion the video echo signals. Those signals may have significant frequency components up to perhaps three megacycles per second. Hence the delay network should have a very high cut-off frequency; it might normally consist of a large number of small inductance-capacitance sections. The schematic representation of this network in the drawing is broken and dotted in the midportion to indicate an indefinite number of pi-type filter sections.

A pulse generated by oscillator 21 simultaneously with each high-power transmitted pulse is applied to the input of the mercury tank. After being delayed in the tank, it is fed into the input of amplifier 23. After amplification the pulse is used to trigger multivibrator 60. The trailing edge of the rectangular voltage from the multivibrator is converted to a sharp positive pulse, as explained in preceding paragraphs, and cause to trigger the modulator to produce the next transmitted pulse. The time delay accomplished by multivibrator 60 may easily be adjusted, by variation of potentiometer 68, until the delay occasioned by the multivibrator plus the inherent delay in the trigger and modulator circuits is precisely equal to the signal delay caused by the high-fidelity delay circuit 40. The result is perfectly timed "firing" of the transmitter, independent of the particular magnitude of delay occasioned by the mercury-tank. If, by reason of a tube replacement or other change in the modulator characteristics, the inherent delay in that circuit changes, only a slight readjustment of potentiometer 68 is necessary to compensate for the change. The variable delay circuit—namely multivibrator 60—is in a low fidelity channel where only a trigger pulse need be passed. Consequently this invention is free from any of the difficult problems arising when an attempt is made to make a high-fidelity delay circuit continuously variable.

It will be recalled that oscillator 21 and amplifier 23 are tuned to a frequency different from that of the I. F. channel. This feature prevents unwanted triggering of the modulator by very strong echoes or received pulses from other echo ranging systems, since those signals have been converted to the I. F. frequency when they reach the mercury-tank delay circuit and thus do not pass through amplifier 23.

Any suitable relay means may of course be provided to trigger the modulator unit once when the system is first turned on, and thereafter the invention will control the transmitter pulsing, keeping it accurately timed for proper system operation.

It will be understood that the embodiment of the invention herein shown and described is exemplary only, and that the scope of the invention is to be determined with reference to the appended claims.

The invention described herein may be manufactured and used by or for the Government of the United States of America for governmental purposes without the payment of any royalties thereon or therefor.

What is claimed is:

1. In a radio echo-ranging system, a transmitter operative when triggered to transmit a pulse of radio energy, receiver means operative to receive echoes of the transmitted pulse reflected by remote objects, means producing a control signal simultaneously with the initiation of the transmitted pulse, first delay means operative to delay the control signal and the received echo signals, second delay means fed by the delayed echo signals from the first delay means, and trigger means responsive to the delay control signal from the first delay means operative to trigger the transmitter after an interval following the transmitted pulse equal to the total delay given the echo signals by the first and second delay means.

2. In a radio echo-ranging system, a transmitter operative when triggered to transmit a pulse of radio energy, receiver means operative to receive echoes of the transmitted pulse reflected by remote objects, means producing a control signal simultaneously with the initiation of the transmitted pulse, first delay means operative to delay the control signal and the received echo signals, second delay means fed by the delayed echo signals from the first delay means, variable delay means fed by the delayed control signal from the first delay means, and trigger means operative to trigger the transmitter responsively to the control signal as delayed by the first delay means and the variable delay means.

3. In a radio echo-ranging system, a transmitter operative when triggered to transmit a pulse of radio energy, receiver means operative to receive echoes of the transmitted pulse reflected by remote objects, means producing a control signal simultaneously with the initiation of the transmitted pulse, first delay means operative to delay the control signal and the received echo signals, second delay means fed by the delayed echo signals from the first delay means, trigger means operative to trigger the transmitter responsively to the control signal, and third delay means feeding the delayed control signal from the first delay means to the trigger means and adjustable to produce intervals between transmitted pulses equal to the total delay given the echo signals by the first and second delay means.

4. In a radio echo-ranging system, a transmitter operative when triggered to transmit a pulse of radio energy, receiver means operative to receive echoes of the transmitted pulse reflected by remote objects, means producing a control signal simultaneously with the initiation of the transmitted pulse, first delay means operative to delay the control signal and the received echo signals, second delay means fed by the delayed echo signals from the first delay means, multivibrator means driven by the delayed control signal from the first delay means operative responsively thereto to produce a voltage pulse after a time interval, control means for the multivibrator operable to vary said time interval, and trigger means operative responsively to the voltage pulse to trigger the transmitter.

5. In a radio echo-ranging system, a transmitter operative when triggered to transmit a pulse of radio energy, receiver means operative to receive echoes of the transmitted pulse reflected by remote objects, means producing a control signal simultaneously with the initiation of the transmitted pulse, first delay means operative to delay the control signal and the received echo signals, second delay means fed by the delayed echo signals from the first delay means, multivibrator means driven by the delayed control signal from the first delay means operative responsively thereto to produce a voltage pulse after an interval of time, trigger means operative responsively to the voltage pulse to trigger the transmitter, and control means for the multivibrator operable to set said interval of time to a value such that the interval between transmitted pulses is equal to the total delay given the echo signals by the first and second delay means.

6. In a radio ranging system, a transmitter operative operative when triggered to transmit a pulse of radio energy, receiver means operative to receive pulse signals related to the transmitted pulse, means providing a control signal synchronized with initiation of the transmitted pulse, first delay means operative to delay the control signal and the received pulse signals, second delay means fed by the delayed received pulse signals from the first delay means, means comparing delayed received pulse signals related to one transmitted pulse to undelayed received pulse signals related to the next transmitted pulse, and trigger means responsive to the delayed control signal from the first delay means operative to trigger the transmitter after an interval following the transmitted pulse equal to the total delay given the received pulse signals by the first and second delay means.

References Cited in the file of this patent

UNITED STATES PATENTS

| | | |
|---|---|---|
| 2,410,424 | Brown | Nov. 5, 1946 |
| 2,422,135 | Sanders | June 10, 1947 |
| 2,491,450 | Holmes | Dec. 13, 1949 |
| 2,532,546 | Forbes | Dec. 5, 1950 |